US011618467B2

(12) United States Patent
Engle et al.

(10) Patent No.: US 11,618,467 B2
(45) Date of Patent: Apr. 4, 2023

(54) DYNAMIC ROUTE INFORMATION INTERFACE

(71) Applicant: GM GLOBAL TECHNOLOGY OPERATIONS LLC, Detroit, MI (US)

(72) Inventors: Stephanie Olivia Engle, San Francisco, CA (US); Mariya Jacobo, San Francisco, CA (US); Jacqueline Mary Shannon, San Francisco, CA (US); David Hyon Berrios, San Francisco, CA (US); Tejeswara Reddy Pogula, San Francisco, CA (US); John Logan Anderson, San Francisco, CA (US); Divya Thakur, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 170 days.

(21) Appl. No.: 17/139,159

(22) Filed: Dec. 31, 2020

(65) Prior Publication Data

US 2021/0122389 A1   Apr. 29, 2021

Related U.S. Application Data

(63) Continuation of application No. 16/133,651, filed on Sep. 17, 2018, now Pat. No. 10,882,537.

(51) Int. Cl.
*B60W 50/14* (2020.01)
*G05D 1/00* (2006.01)
(Continued)

(52) U.S. Cl.
CPC ............ *B60W 50/14* (2013.01); *B60W 30/18* (2013.01); *G05D 1/0088* (2013.01);
(Continued)

(58) Field of Classification Search
CPC ................. B60W 50/14; B60W 30/18; B60W 2554/146; B60W 2710/30;
(Continued)

(56) References Cited

U.S. PATENT DOCUMENTS 7,880,602 B2    2/2011  Kasamatsu
8,676,431 B1 *  3/2014  Mariet ................. G08G 1/0962
                                                              701/28
(Continued)

FOREIGN PATENT DOCUMENTS

WO         2016109635 A1      7/2016

OTHER PUBLICATIONS

"Non-Final Office Action for U.S. Appl. No. 16/133,651", dated Aug. 17, 2020, 12 Pages.
(Continued)

*Primary Examiner* — Yazan A Soofi
(74) *Attorney, Agent, or Firm* — Calfee, Halter & Griswold LLP

(57) ABSTRACT

Various technologies described herein pertain to causing presentation on a user interface of an immediate portion of a navigation route of an autonomous vehicle. A computing system of the autonomous vehicle determines whether an object detected by sensor(s) of the autonomous vehicle proximate to the immediate portion of the navigation route are of a type and relative position defined as one of consequential and inconsequential for a human passenger. In response to determining that an object has both a type and relative position defined as consequential, the computing system causes presentation on the user interface a representation of the object relative to the immediate portion of the navigation route to provide a confidence engendering indication that the autonomous vehicle has detected the object. Otherwise if inconsequential, presentation on the user inter-
(Continued)

face of any representation of the object is not caused by the computing system to avoid creating a confusing presentation.

20 Claims, 6 Drawing Sheets

(51) Int. Cl.
   *B60W 30/18* (2012.01)
   *G05D 1/02* (2020.01)
(52) U.S. Cl.
   CPC ..... *G05D 1/0214* (2013.01); *B60W 2050/146* (2013.01); *B60W 2554/00* (2020.02); *B60W 2555/60* (2020.02); *B60W 2710/30* (2013.01); *B60W 2900/00* (2013.01); *G05D 2201/0213* (2013.01)
(58) Field of Classification Search
   CPC .... B60W 2050/146; G05D 2201/0213; G05D 1/0214; G05D 1/0088
   USPC .......................................................... 701/23
   See application file for complete search history.

(56) References Cited

U.S. PATENT DOCUMENTS

| | | | |
|---|---|---|---|
| 8,874,372 B1 | 10/2014 | Zhu et al. | |
| 8,903,592 B1 | 12/2014 | Mariet et al. | |
| 9,454,340 B2 | 9/2016 | Park | |
| 9,582,907 B1 | 2/2017 | Szybalski et al. | |
| 9,789,880 B2* | 10/2017 | Sweeney | B60W 50/16 |
| 9,849,784 B1* | 12/2017 | Chan | G08G 1/015 |
| 9,902,403 B2* | 2/2018 | Donnelly | B60W 10/18 |
| 9,904,859 B2* | 2/2018 | Grauer | G06V 20/58 |
| 10,332,292 B1 | 6/2019 | Arnicar | |
| 10,360,714 B1* | 7/2019 | Xue | G06T 11/60 |
| 10,558,416 B2 | 2/2020 | Suzuki et al. | |
| 10,882,537 B2* | 1/2021 | Engle | B60W 50/14 |
| 2009/0228204 A1 | 9/2009 | Zavoli et al. | |
| 2017/0270375 A1* | 9/2017 | Grauer | G06V 10/60 |
| 2018/0066956 A1 | 3/2018 | Kim et al. | |
| 2018/0136651 A1 | 5/2018 | Levinson et al. | |
| 2018/0173237 A1 | 6/2018 | Reiley et al. | |
| 2019/0094040 A1 | 3/2019 | Lewis et al. | |
| 2019/0383631 A1 | 12/2019 | Bigio et al. | |
| 2020/0086888 A1 | 3/2020 | Engle et al. | |

OTHER PUBLICATIONS

"Reply to Non-Final Office Action for U.S. Appl. No. 16/133,651", Filed Date: Nov. 17, 2020, 13 Pages.

"Notice of Allowance and Fees Due for U.S. Appl. No. 16/133,651", dated Nov. 25, 2020, 9 Pages.

\* cited by examiner

DYNAMIC ROUTE INFORMATION INTERFACE

CROSS-REFERENCE TO RELATED APPLICATION

This application is a continuation of U.S. patent application Ser. No. 16/133,651, filed on Sep. 17, 2018, and entitled "DYNAMIC ROUTE INFORMATION INTERFACE", the entirety of which is incorporated herein by reference.

BACKGROUND

The present application generally relates to autonomously driven passenger vehicles and more particularly relates to a user interface of an autonomously driven passenger vehicle.

Automated controls of vehicles have been utilized for an extended period in aviation, railroad and ship technology. The respective routes through air, on rail, and over water tend not to have the close proximity of other vehicles that complicate path control. More recently, advances in image recognition combined with range finding and geographical road navigation have combined to enable autonomous vehicles to operate on vehicle roadways. The autonomous vehicles have to coexist within close proximity to other vehicles, pedestrians, cyclists, and road hazards. Object detection and avoidance have received extensive development with many dynamic predictions and strategies being continuously assessed during operation of the autonomous vehicles.

Generally-known user interfaces provided in the autonomous vehicle for passengers include display of the immediate portion of the route of the autonomous vehicle. An upcoming or currently executed path strategy are displayed to explain what the autonomous vehicle is doing or will do. However, these simple user interfaces omit significant amounts of information. A passenger can see through the windshield many potential road hazards or unpredictable fellow travelers on the roadway. Unless an object is detected as requiring an immediate countermeasure to avoid, the simple user interface does not provide assurance to a passenger that the object is being monitored.

Less well known are engineering-oriented user interfaces that display detailed results of object detection, recognition, and predictions as well as a range of strategies being assessed. Development and commissioning of an autonomous vehicle by knowledgeable engineers benefit from being able to monitor a wide range of computation results by the autonomous vehicle. However, such a detailed user interface is disconcerting to a typical passenger who can get lost in the cluttered display. Confidence in the autonomous vehicle can be shaken by seeing objects displayed that are humanly perceptible as inconsequential. Similarly, seeing a range of strategies being considered can be disconcerting when a low confidence strategy is displayed that does not appear applicable at all to a passenger.

SUMMARY

The following is a brief summary of subject matter that is described in greater detail herein. This summary is not intended to be limiting as to the scope of the claims. The present innovation is directed at least in part to presenting to a passenger on a user interface a portion of objects detected by an autonomous vehicle and a portion of path adjustment options being considered by the autonomous vehicle. Expertise is utilized in filtering possible status information to engender confidence in the passenger that the autonomous vehicle is aware of potential hazards ahead and has good alternatives to address each hazard. Filtering also removes inconsequential detected objects and low confidence options from the display that could cause confusion or degrade confidence in the autonomous vehicle.

In accordance with one aspect of the present innovation, a method includes causing presentation on a user interface of an immediate portion of a navigation route of an autonomous vehicle. The method includes determining whether an object detected by one or more sensors of the autonomous vehicle proximate to the immediate portion of the navigation route are of a type and relative position defined as one of consequential and inconsequential for a human passenger. In response to determining that the object has both a type and relative position defined as consequential, the method includes causing presentation on the user interface a representation of the object relative to the immediate portion of the navigation route to provide a confidence engendering indication that the autonomous vehicle has detected the object. In response to determining that the object does not have both a type and relative position defined as consequential and is thus inconsequential, the method includes not causing presentation on the user interface of any representation of the object to avoid creating a confusing presentation.

In one aspect of the present disclosure, an autonomous vehicle includes one or more sensors that sense objects in an immediate portion of a route of the autonomous vehicle. The autonomous vehicle includes a user interface device that presents a user interface to a passenger of the autonomous vehicle. The autonomous vehicle includes a computing system that is in communication with one or more sensors and the user interface device, and that comprises a memory comprising instructions and a processor that executes the instructions to cause the autonomous vehicle to perform acts. The acts include causing presentation on the user interface of the immediate portion of a navigation route of the autonomous vehicle. The acts include determining whether an object detected by the one or more sensors of the autonomous vehicle proximate to the immediate portion of the navigation route are of a type and relative position defined as one of consequential and inconsequential for a human passenger. In response to determining that the object has both a type and relative position defined as consequential, the acts include causing presentation on the user interface a representation of the object relative to the immediate portion of the navigation route to provide a confidence engendering indication that the autonomous vehicle has detected the object. In response to determining that the object does not have both a type and relative position defined as consequential and is thus inconsequential, the acts include not causing presentation on the user interface of any representation of the object to avoid creating a confusing presentation.

In one aspect according to the present disclosure, a computer program product includes program code on a computer readable storage device that, when executed by a processor associated with an electronic device, the program code enables the electronic device to provide functionality. The functionality includes causing presentation on a user interface of an immediate portion of a navigation route of an autonomous vehicle. The functionality includes determining whether an object detected by one or more sensors of the autonomous vehicle proximate to the immediate portion of the navigation route are of a type and relative position defined as one of consequential and inconsequential for a human passenger. In response to determining that the object has both a type and relative position defined as consequential, the functionality includes causing presentation on the user interface a representation of the object relative to the immediate portion of the navigation route to provide a confidence engendering indication that the autonomous vehicle has detected the object. In response to determining that the object does not have both a type and relative position defined as consequential and is thus inconsequential, the functionality includes not causing presentation on the user interface of any representation of the object to avoid creating a confusing presentation.

The above summary presents a simplified summary to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
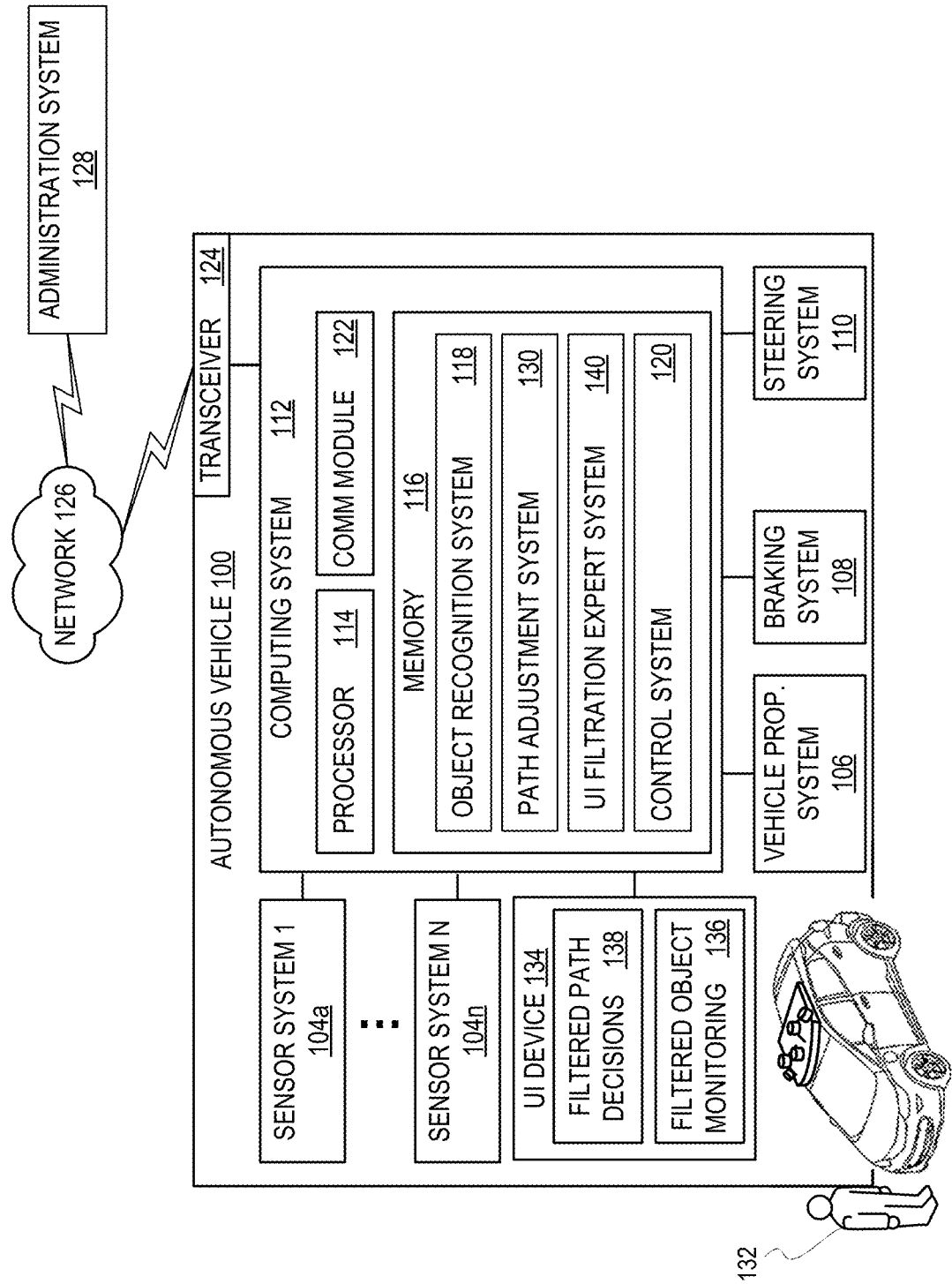
FIG. 1 is a functional block diagram that illustrates an exemplary autonomous vehicle system having a user interface that presents filtered object monitoring and path adjustment decisions to engender passenger confidence, according to one or more embodiments.

A method, autonomous vehicle, and computer program product cause presentation on a user interface of an immediate portion of a navigation route of an autonomous vehicle. A computing system of the autonomous vehicle determines whether an object detected by one or more sensors of the autonomous vehicle proximate to the immediate portion of the navigation route are of a type and relative position defined as one of consequential and inconsequential for a human passenger. In response to determining that an object has both a type and relative position defined as consequential, the computing system causes presentation on the user interface of a representation of the object relative to the immediate portion of the navigation route to provide a confidence engendering indication that the autonomous vehicle has detected the object. Otherwise if inconsequential, presentation on the user interface of any representation of the object is not caused by the computing system to avoid creating a confusing presentation.

As set forth herein, like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, illustrated is an exemplary autonomous vehicle 100 that can navigate about roadways without human conduction based upon sensor signals output by sensor systems. The autonomous vehicle 100 includes a plurality of sensor systems 104a-n (a first sensor system 104a through an Nth sensor system 104n). The sensor systems 104a-n are of different types and are arranged about the autonomous vehicle 100. For example, the first sensor system 104a may be a lidar sensor system and the Nth sensor system 104n may be a camera (image) system. Other exemplary sensor systems include radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include but are not limited to, a vehicle propulsion system 106, a braking system 108, and a steering system 110. The vehicle propulsion system 106 may be an electric motor, an internal combustion engine, or a combination thereof. The braking system 108 can include an engine break, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 104a-n and is further in communication with the vehicle propulsion system 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 comprises an object recognition system 118 that is configured to assign labels to objects (in proximity to the autonomous vehicle 100) captured in sensor signals output by the sensor systems 104a-104n. The memory 116 additionally includes a control system 120 that is configured to receive output of the object recognition system 118 to adjust a route and is further configured to control at least one of the mechanical systems (the vehicle propulsion system 106, the brake system 108, and/or the steering system 110) based upon the output of the object recognition system 118.

The route for the autonomous vehicle 100 can be locally determined. In one or more embodiments, a communication module 122 encodes and decodes communication protocols for a transceiver 124 to transceive via a network 126 to an administration system 128. Administration system 128 can perform routing for a population of autonomous vehicles 100. Path adjustments to the route can be made locally at the autonomous vehicle 100 by a path adjustment system 130 executed by computing system 112 and responsive to sensor systems 104a-n. In real-time, computing system 112 evaluates numerous objects with object recognition system 118 and considers numerous path changes with path adjustment system 130. A portion of the objects that are recognized and monitored are presented to a passenger 132 via a user interface (UI) device 134. Additionally or alternatively, one or more representations of the path changes evaluated by the path adjustment system 130 can be presented to the passenger 132 via the user interface device 134.

Since the passenger 132 can see potential road hazards approaching the autonomous vehicle 100, user interface device 134 presents filtered object monitoring results 136 and filtered path decisions 138 that provide situational awareness without being confusing or disheartening. To that end, a UI filtration expert system 140 executed by computing system 112 provides categorizations of recognized objects and path adjustments being considered. UI filtration expert system 140 filters according to those categorization to cause presentation of information that passenger 132 would consider as consequential and not what would be inconsequential. Passenger 132 would tend to readily recognize many objects proximate to the path of autonomous vehicle 100 as inconsequential, presenting no hazard. For example, if remaining in a present road lane, the autonomous vehicle would not identify fixed objects such as a fire hydrant, telephone pole, or building to be hazardous. Conversely, a child or pet on the sidewalk next to a roadway could unexpectedly move onto the lane in front of the autonomous vehicle 100. Cyclists or vehicles in other lanes could ill-advisedly swerve into a path of the autonomous vehicle. Passenger 130 would benefit from knowing that such consequential objects are recognized and being tracked by computing system 112. Similarly, objects that prompt a path adjustment of the autonomous vehicle 100 warrant planning for possible path adjustments. Some strategies can be unwarranted or ineffective and receive a corresponding low confidence level by computing system 112. Filtering such unlikely strategies from passenger 132 can be beneficial in avoiding alarm that the autonomous vehicle 100 is even considering such strategies.

TABLE 1 is an example of an expert rule-based system for categorizing objects as being either consequential or inconsequential, assuming being within a proximate distance from a path of an autonomous vehicle.

TABLE 1

| Size Template | Motion | Position | Status | Strategy |
|---|---|---|---|---|
| Small object or smaller | No Motion | In path | Consequential | Includes straddling if lane change unavailable to prevent tire damage. Indication given of road debris. Abrupt strategy discouraged. |
| Any size larger than small object | No Motion | In path | Consequential | Straddling not an option. Abrupt strategy discouraged. |
| Larger than a vehicle | No Motion | Not in path | Inconsequential | May be a building or tree. Provide no indication. |
| Smaller than child | No Motion | Not in path | Inconsequential | Items like fire hydrants. Provide no indication. |
| Human sized | Motion or No Motion | Not in path | Consequential if within range of movement | Predict possible movements that could intersect with path. |
| Cyclist sized | Motion or No Motion | Not in path but on roadway | Consequential if within range of movement | Predict possible movements according to roadway and traffic control (including small chance of human error) that could intersect with path. |
| Any size | Motion toward path | Not in path yet but predicted to have an intersecting path | Consequential | Predict possible movements and implement avoidance strategy. |
| Any size | Motion toward path | Predicted to cross path within 3 car lengths but paths not predicted to intersect | Consequential | Indicate object recognition but no avoidance strategy. |
| Any size | Motion toward path | Predicted to cross path more than 3 car lengths away | Inconsequential | Filter indication. |

In one or more embodiments, a rule-based expert system can be generated by training a neural net to mimic filtering for consequential and inconsequential objects based on human decision making. Video or still image scenarios can be presented to a human test subjects to elicit whether any objects detected would be deemed consequential for display. In one or more embodiments, image recognition capabilities are sufficient to label objects into tightly defined categories such as child, pet, ball, bicyclist, motor cyclist, van, truck, car, tree, building, street sign, traffic light, road debris, etc. Each type of object can have a classification assigned.

Figure 2:
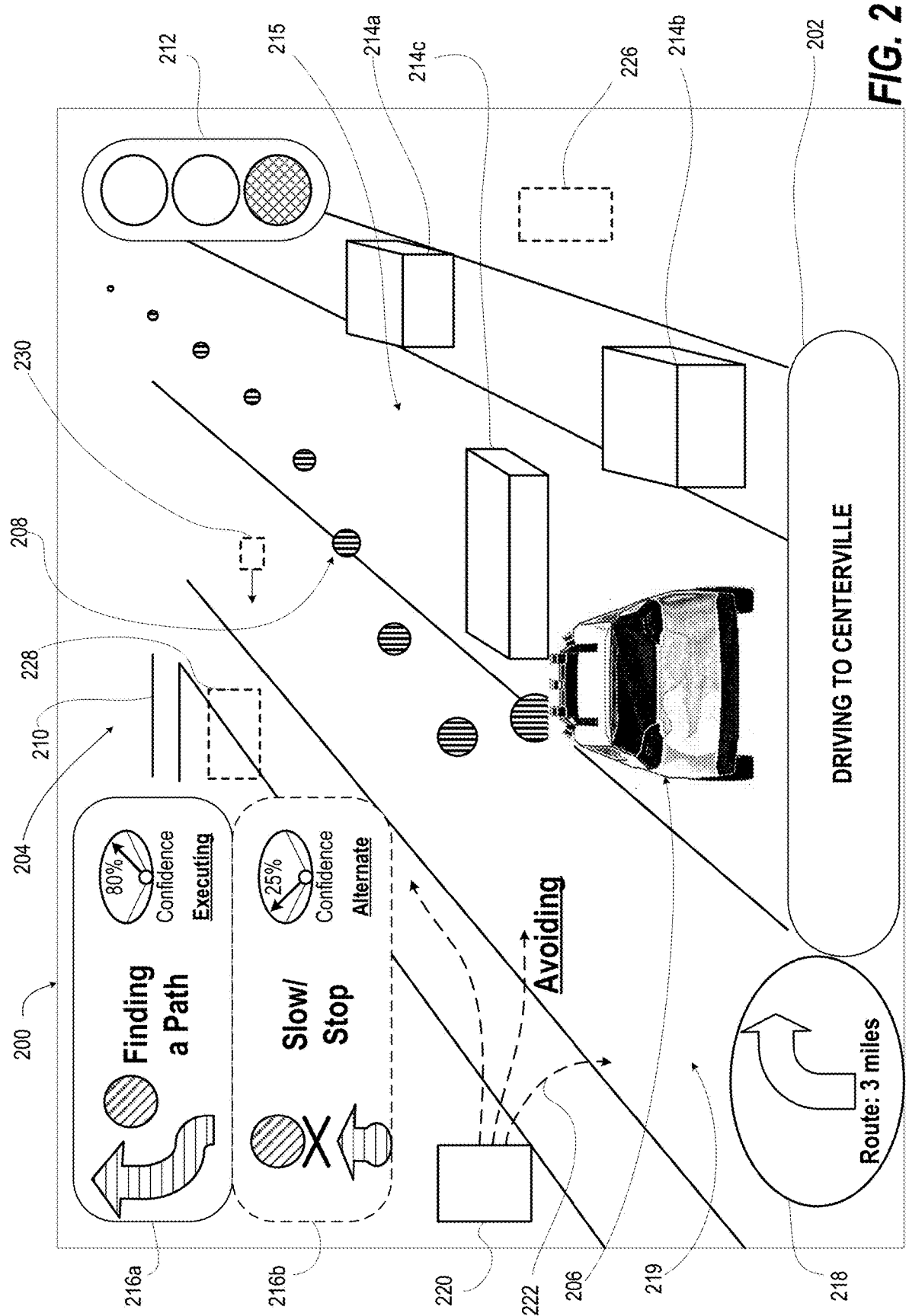
FIG. 2 is display diagram of an exemplary user interface device of the autonomous vehicle system of FIG. 1, according to one or more embodiment.

FIG. 2 is graphical screen depiction illustrating a user interface 200 that includes a textual route summary 202 and a perspective first person view of an immediate portion of a route 204. The route is based on geographical map and current traffic conditions that is stored on the autonomous vehicle or received from a remote source. A depiction of an autonomous vehicle 206 is localized within the immediate portions with any path deviation or adjustment 208 annotated on the route 204. Certain geographic fixed features 210 such as a side road can be depicted to enhance situational awareness of a passenger, enabling matching of the user interface 200 to what is humanly viewable through windshield. In one or more embodiments, user interface 200 can be an augmented reality view superimposed upon a heads-up display through which the actual front windshield scene is viewed or on a display that merges a video image with augmentation.

A traffic control device indication 212, such as a traffic light, corresponds to the status of the next traffic control device along the route. Object recognition can be relied upon to ascertain current traffic signals. In one or more embodiments, positioning of such traffic controls is known in advance and/or status information is communicated to the autonomous vehicle. Display of any applicable traffic controls help to explain instances where the autonomous vehicle is stopping in response to a traffic control. Traffic signage that is informational rather than route affecting can be omitted from display to avoid cluttering the user interface 200.

Objects can be displayed that are in the roadway, such as parked vehicles 214a-214b and a stopped or slowing vehicle 214c that is in the same lane 215 as the autonomous vehicle 206. Stopped or slowing vehicle 214c is deemed a consequential object warranting display as well as prompting development of strategies 216a-216b respectively for finding a path with 80% confidence and slow or stop within the same lane with 25% confidence. Presentation of the backup strategy can engender confidence that the autonomous vehicle is contemplating alternatives in case the primary strategy becomes unviable due to further situational changes. However, low confidence strategies that are unlikely to be chosen nor unlikely to succeed if chosen are not displayed. Strategies 216a-216b can be path deviation or adjustment 208 that does not affect the route, such as represented by a next turn indication 218. Path deviation or adjustment 208 can represent a lane change into a left-hand lane 219, for instance.

Object indication 220 along a left side of user interface 200 represents an object that is image recognized or has a size and position that is deemed consequential for displaying. Objects in this proximity of certain sizes or types can create anxiety in a passenger unless the passenger understands the autonomous vehicle is aware of the object. Predictions as to possible future vectors 222 for the object indication 220 can be displayed to give an indication that the planned path of the autonomous vehicle 206 will avoid the object indication 220. For example, a current vector can be a stationary position. Based on image recognition, the object can be deemed to be mobile and capable of moving within certain ranges of speeds. Given past movement, the type of object, aspects of the roadway and traffic signals, predicted vectors can have evaluated probabilities. For example, a cyclist can be expected to obey certain rules of the roads. Conversely, a small human-like object can conservatively be expected to act erratically like a small child or dog. If the object is already moving, a high probability can be assessed that the vector will remain unchanged, at least in the short term.

As set forth herein, the term "sized" is intended to mean prediction. For instance, cyclist sized is intended to mean that an object is predicted to be a cyclist. Accordingly, size is one aspect utilized to predict whether an object is a cyclist. Moreover, it is to be appreciated that sometimes there are objects that are human sized that are not actually human (e.g., a standalone mailbox); thus, aspects other than size can be utilized to predict whether an object having a size of a human is actually a human.

Stationary object 226 along a right side of the user interface 200 represents a small object such as a fire hydrant that is detected but not displayed because the object is deemed inconsequential. Stationary object 228 farther away on the left side represents a large object that is not in the path of the autonomous vehicle 206, and is thus deemed to be inconsequential. Distant, moving object 230 represents an object that is far enough away and detected as leaving the path well in advance of the autonomous vehicle 206, and is thus deemed to be inconsequential.

Figure 3:
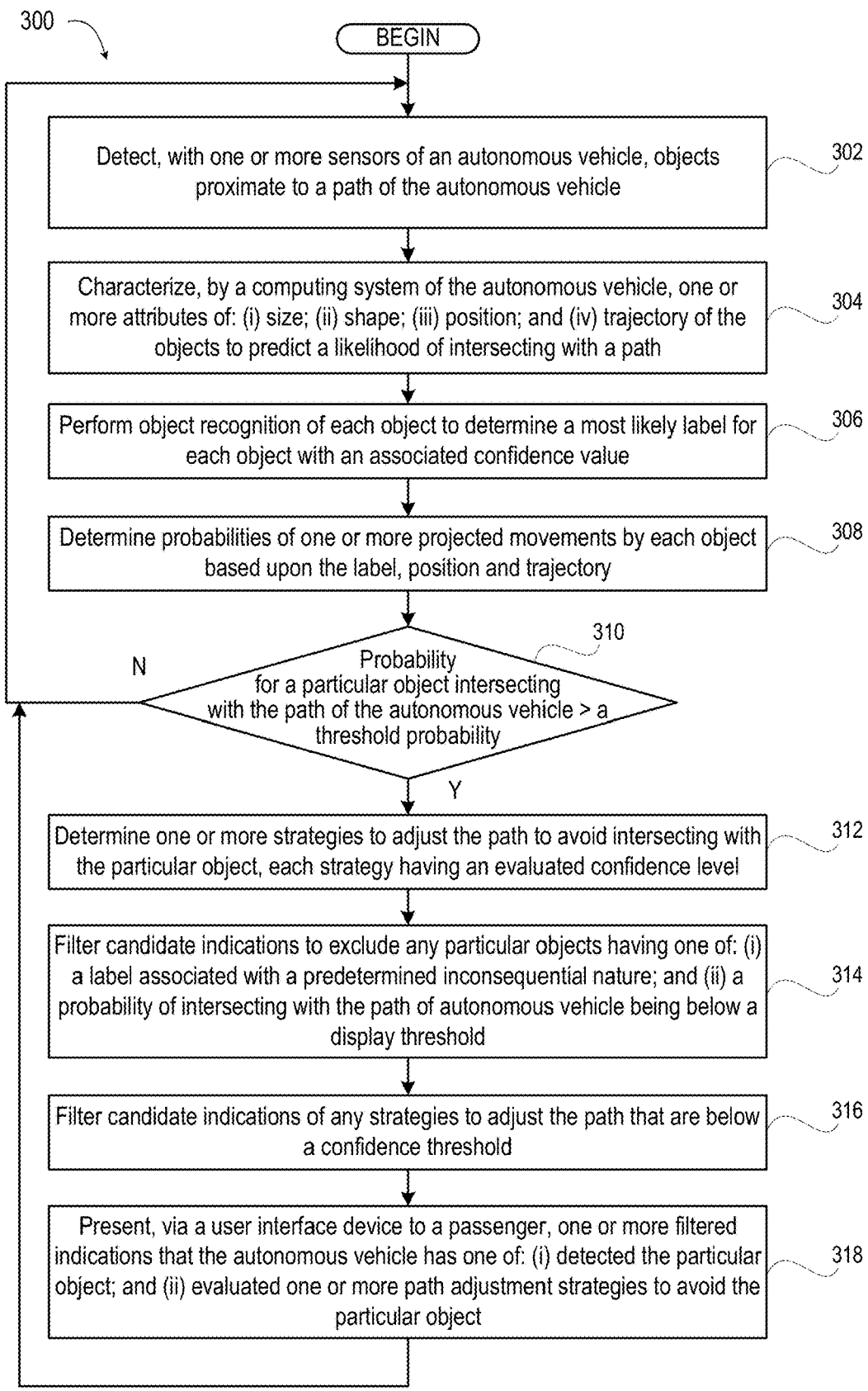
FIG. 3 is a flow diagram illustrating an exemplary methodology for filtering indications to a passenger of object detection and avoidance to engender confidence in an autonomous vehicle while avoiding confusing indications, according to one or more embodiment.

FIG. 3 is a flow diagram illustrating an exemplary methodology or method 300 for filtering indications to a passenger of object detection and avoidance to engender confidence in an autonomous vehicle while avoiding confusing indications. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Method 300 begins detecting objects proximate to a path of an autonomous vehicle with one or more sensors of the autonomous vehicle (block 302). Method 300 includes characterizing, by a computing system of the autonomous vehicle, one or more attributes of: (i) size; (ii) shape; (iii) position; and (iv) trajectory of the objects to predict a likelihood of intersecting with a path of the autonomous vehicle (block 304). In one or more embodiments, method 300 includes performing object recognition of each object to determine a most likely label for each object with an associated confidence value (block 306). Based upon the label, position and trajectory, method 300 includes determining probabilities of one or more projected movements by each object (block 308). A determination is made whether the probability of at least one projected movement by a particular object intersecting with the path of the autonomous vehicle is greater than a threshold probability (decision block 310). In response to determining that the probability of at least one projected movement by a particular object intersecting with the path of the autonomous vehicle is not greater than the threshold probability, method 300 returns to block 302 to continue monitoring for objects that warrant indication or a path adjustment strategy. In response to determining that the probability of at least one projected movement by a particular object intersecting with the path of the autonomous vehicle is greater than the threshold probability, method 300 includes determining one or more strategies to adjust the path to avoid intersecting with the particular object, each strategy having an evaluated confidence level (block 312). Method 300 includes filtering candidate indications to exclude any particular objects having one of: (i) a label associated with a predetermined inconsequential nature; and (ii) a probability of intersecting with the path of autonomous vehicle being below a display threshold (block 314). Method 300 includes filtering candidate indications of any strategies to adjust the path that are below a confidence threshold (block 316). Method 300 includes presenting, via a user interface device to a passenger, one or more filtered indications that the autonomous vehicle has one of: (i) detected the particular object; and (ii) evaluated one or more path adjustment strategies to avoid the particular object (block 318). Then method returns to block 302 to continue monitoring for objects.

Figure 4A:
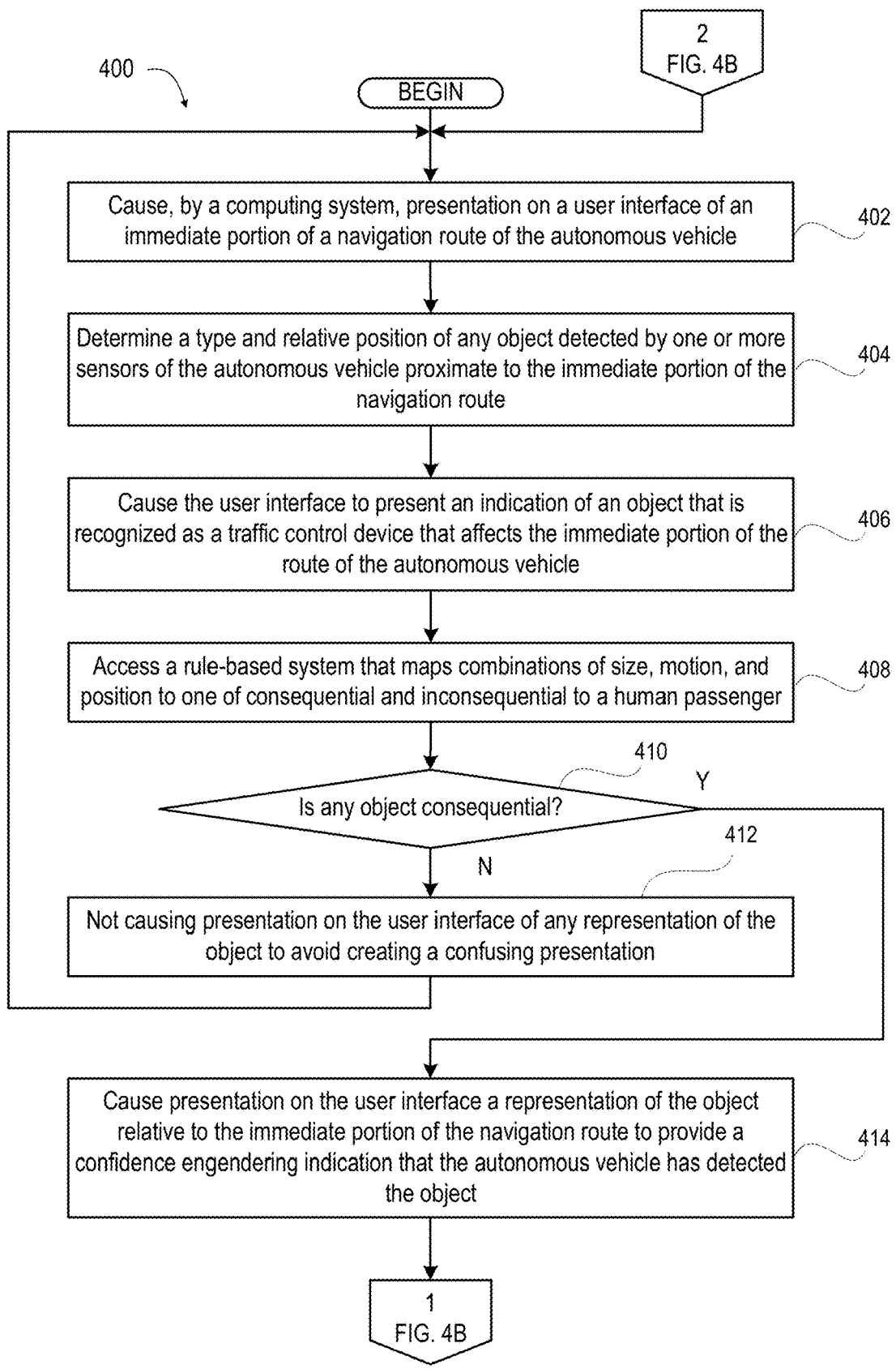
FIG. 4A-4B are a flow diagram illustrating an exemplary methodology for presenting filtered object monitoring and path adjustment decisions to engender passenger confidence, according to one or more embodiments.
Figure 4B:
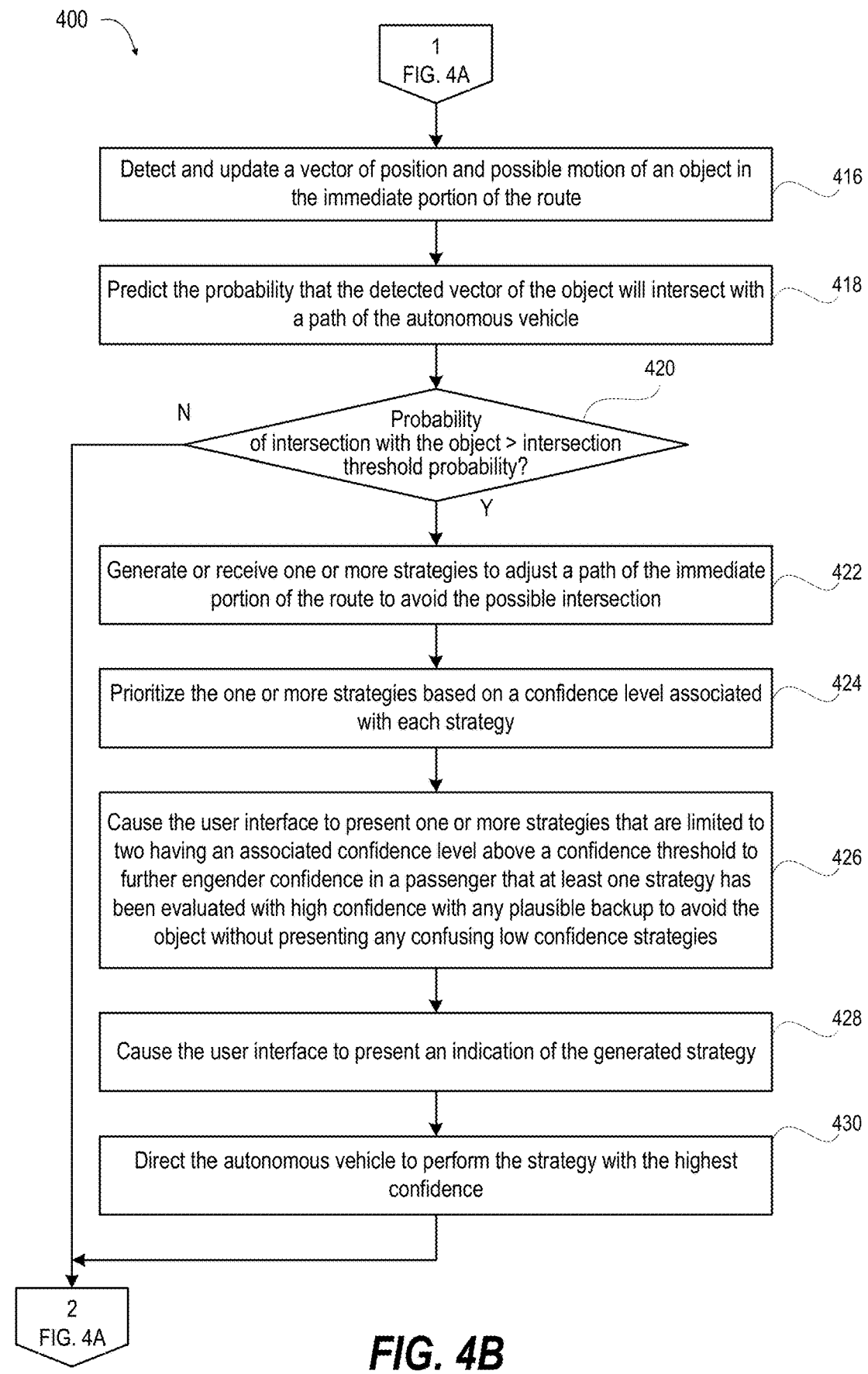

FIGS. 4A-4B illustrate an exemplary method 400 of filtering detected objects and avoidance strategies for presenting to a passenger of an autonomous vehicle. In one or more embodiments, method 400 includes causing, by a computing system, presentation on a user interface of an immediate portion of a navigation route of the autonomous vehicle (block 402). Method 400 includes determining a type and relative position of any object detected by one or more sensors of the autonomous vehicle proximate to the immediate portion of the navigation route (block 404). Method 400 includes causing the user interface to present an indication of an object that is recognized as a traffic control device that affects the immediate portion of the route of the autonomous vehicle (block 406). Method 400 includes accessing a rule-based system that maps combinations of size, motion, and position to one of consequential and inconsequential to a human passenger (block 408). A determination is made as to whether any object is consequential (decision block 410). In response to determining that the object does not have both a type and relative position defined as consequential and is thus inconsequential, method 400 includes not causing presentation on the user interface of any representation of the object to avoid creating a confusing presentation (block 412). Then method returns to block 402 to continue monitoring.

In response to determining that the object has both a type and relative position defined as consequential in decision block 410, method 400 includes causing presentation on the user interface a representation of the object relative to the immediate portion of the navigation route to provide a confidence engendering indication that the autonomous vehicle has detected the object (block 414). Method 400 includes detecting and updating a vector of position and possible motion of an object in the immediate portion of the route (block 416). Method 400 includes predicting the probability that the detected vector of the object will intersect with a path of the autonomous vehicle (block 418). A determination is made whether the probability that the detected vector of the object will intersect the path is greater than a intersection threshold probability (decision block 420). In response to not detecting a possible intersection, method 400 returns to block 402 to continue monitoring route and objects. In response to detecting a possible intersection in decision block 420, method 400 includes generating or receiving one or more strategies to adjust a path of the immediate portion of the route to avoid the possible intersection (block 422). Method 400 includes prioritizing the one or more strategies based on a confidence level associated with each strategy (block 424). Method 400 includes causing the user interface to present one or more strategies that are limited to two having an associated confidence level above a confidence threshold to further engender confidence in a passenger that at least one strategy has been evaluated with high confidence to avoid the object without presenting any confusing low confidence strategies (block 426). Method 400 includes causing the user interface to present an indication of the generated strategy (block 428). Method 400 includes directing the autonomous vehicle to perform the strategy with the highest confidence (block 430). Then method 400 returns to block 402 to continue monitoring.

Figure 5:
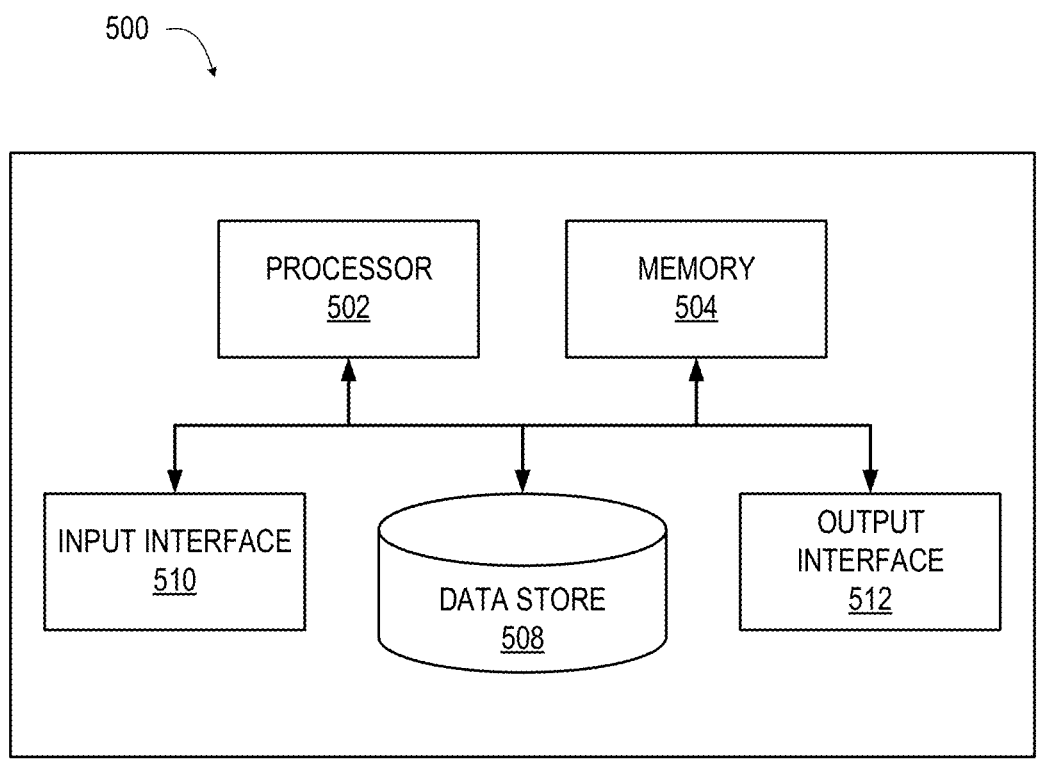
FIG. 5 illustrates an exemplary computing device, according to one or more embodiments.

Referring now to FIG. 5, a high-level illustration of an exemplary computing device 500 that can be used in accordance with the systems and methodologies disclosed herein is illustrated. For instance, the computing device 500 may be or include the computing system 112 of the autonomous vehicle 100. According to another example, the administration system 128 of FIG. 1 can be or include the computing device 500. The computing device 500 includes at least one processor 502 (e.g., the processor 114) that executes instructions that are stored in a memory 504 (e.g., the memory 116). The instructions may be, for instance, instructions for implementing functionality described as being carried out by one or more systems discussed above or instructions for implementing one or more of the methods described above. The processor 502 may be a GPU, a plurality of GPUs, a CPU, a plurality of CPUs, a multi-core processor, etc. The processor 502 may access the memory 504 by way of a system bus 506.

The computing device 500 additionally includes a data store 508 that is accessible by the processor 502 by way of the system bus 506. The computing device 500 also includes an input interface 510 that allows external devices to communicate with the computing device 500. For instance, the input interface 510 may be used to receive instructions from an external computer device, etc. The computing device 500 also includes an output interface 512 that interfaces the computing device 500 with one or more external devices. For example, the computing device 500 may transmit control signals to the vehicle propulsion system 106, the braking system 108, and/or the steering system 110 by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   causing a user interface of an autonomous vehicle to present a portion of a navigation route of the autonomous vehicle;
   detecting an object in proximity to the autonomous vehicle based on output from one or more sensors of the autonomous vehicle;
   causing the user interface to present a representation of the object in the portion of the navigation route;
   identifying at least a first strategy to adjust a path in the navigation route to avoid the object and a second strategy to adjust the path in the navigation route to avoid the object;
   causing the user interface to present a representation of the first strategy to adjust the path in the navigation route to avoid the object and a representation of the second strategy to adjust the path in the navigation route to avoid object; and
   controlling the autonomous vehicle to perform one of the first strategy or the second strategy to adjust the path in the navigation route to avoid the object.

2. The method of claim 1, further comprising:
   determining whether to present the representation of the object on the user interface, wherein the determination is based on at least one of a type of the object or a position of the object relative to the autonomous vehicle, and wherein the user interface is caused to selectively present the representation of the object in the portion of the navigation route based on the determination.

3. The method of claim 2, wherein the determination is further based on a predicted change in position of the object relative to the autonomous vehicle.

4. The method of claim 1, wherein the first strategy to adjust the path in the navigation route to avoid the object is presented as a primary strategy and the second strategy to adjust the path in the navigation route to avoid the object is presented as a backup strategy for use if the primary strategy becomes unviable.

5. The method of claim 1, further comprising:
   prioritizing at least the first strategy and the second strategy based on a confidence level associated with each strategy;
   wherein the first strategy and the second strategy each have a corresponding confidence level above a confidence threshold.

6. The method of claim 1, further comprising:
   in response to the path in the navigation route of the autonomous vehicle being adjusted based on the object, causing the user interface to present an indication of the path as adjusted that depicts avoidance of the representation of the object.

7. The method of claim 1, further comprising:
   causing the user interface to present an indication of a state of a traffic control device for the portion of the navigation route of the autonomous vehicle.

8. An autonomous vehicle, comprising:
   one or more sensors;
   a user interface device that presents a user interface in the autonomous vehicle; and
   a computing system that is in communication with the one or more sensors and the user interface device, wherein the computing system comprises:
   a processor; and
   memory that stores computer-executable instructions that, when executed by the processor, cause the processor to perform acts comprising:
   causing the user interface to present a portion of a navigation route of the autonomous vehicle;
   detecting an object in proximity to the autonomous vehicle based on output from the one or more sensors;
   causing the user interface to present a representation of the object in the portion of the navigation route;
   identifying at least a first strategy to adjust a path in the navigation route to avoid the object and a second strategy to adjust the path in the navigation route to avoid the object;
   causing the user interface to present a representation of the first strategy to adjust the path in the navigation route to avoid the object and a representation of the second strategy to adjust the path in the navigation route to avoid object; and
   controlling the autonomous vehicle to perform one of the first strategy or the second strategy to adjust the path in the navigation route to avoid the object.

9. The autonomous vehicle of claim 8, wherein the memory further stores computer-executable instructions that, when executed by the processor, cause the processor to perform acts comprising:
   determining whether to present the representation of the object on the user interface, wherein the determination is based on at least one of a type of the object, a position of the object relative to the autonomous vehicle, or a predicted change in position of the object relative to the autonomous vehicle, and wherein the user interface is caused to selectively present the representation of the object in the portion of the navigation route based on the determination.

10. The autonomous vehicle of claim 8, wherein the first strategy to adjust the path in the navigation route to avoid the object is presented as a primary strategy and the second strategy to adjust the path in the navigation route to avoid the object is presented as a backup strategy for use if the primary strategy becomes unviable.

11. The autonomous vehicle of claim 8, wherein the memory further stores computer-executable instructions that, when executed by the processor, cause the processor to perform acts comprising:
prioritizing at least the first strategy and the second strategy based on a confidence level associated with each strategy;
wherein the first strategy and the second strategy each have a corresponding confidence level above a confidence threshold.

12. The autonomous vehicle of claim 8, wherein the memory further stores computer-executable instructions that, when executed by the processor, cause the processor to perform acts comprising:
in response to the path in the navigation route of the autonomous vehicle being adjusted based on the object, causing the user interface to present an indication of the path as adjusted that depicts avoidance of the representation of the object.

13. The autonomous vehicle of claim 8, wherein the memory further stores computer-executable instructions that, when executed by the processor, cause the processor to perform acts comprising:
causing the user interface to present an indication of a state of a traffic control device for the portion of the navigation route of the autonomous vehicle.

14. The autonomous vehicle of claim 8, the user interface device being a heads-up display.

15. A user interface device, comprising:
a processor; and
memory that stores computer-executable instructions that, when executed by the processor, cause the processor to perform acts comprising:
presenting a portion of a navigation route of an autonomous vehicle as part of a user interface outputted by the user interface device;
responsive to an object being detected as being in proximity to the autonomous vehicle, presenting a representation of the object in the portion of the navigation route as part of the user interface outputted by the user interface device; and
presenting a representation of a first strategy to adjust a path in the navigation route to avoid the object and a second strategy to adjust the path in the navigation route to avoid the object as part of the user interface outputted by the user interface device;
wherein one of the first strategy or the second strategy is performed by the autonomous vehicle to adjust the path in the navigation route to avoid the object.

16. The user interface device of claim 15, wherein the representation of the object is selectively presented based on at least one of a type of the object, a position of the object relative to the autonomous vehicle, or a predicted change in position of the object relative to the autonomous vehicle.

17. The user interface device of claim 15, wherein the first strategy to adjust the path in the navigation route to avoid the object is presented as a primary strategy and the second strategy to adjust the path in the navigation route to avoid the object is presented as a backup strategy for use if the primary strategy becomes unviable.

18. The user interface device of claim 15, wherein the memory further stores computer-executable instructions that, when executed by the processor, cause the processor to perform acts comprising:
in response to the path in the navigation route of the autonomous vehicle being adjusted based on the object, presenting an indication of the path as adjusted that depicts avoidance of the representation of the object as part of the user interface outputted by the user interface device.

19. The user interface device of claim 15 being a heads up display.

20. The user interface device of claim 15, wherein the memory further stores computer-executable instructions that, when executed by the processor, cause the processor to perform acts comprising:
presenting an indication of a state of a traffic control device for the portion of the navigation route of the autonomous vehicle.

* * * * *